United States Patent
Moriga et al.

(10) Patent No.: US 6,872,796 B2
(45) Date of Patent: Mar. 29, 2005

(54) SEALING GASKET FOR CLOSURE AND PROCESS FOR PRODUCTION OF CLOSURE USING THE SAME

(75) Inventors: Toshinori Moriga, Tokyo (JP); Hiroei Yokota, Chigasaki (JP); Toshihiko Tsuchida, Yokohama (JP); Noriyoshi Yano, Zushi (JP)

(73) Assignees: Toyo Seikan Kaisha, Ltd., Tokyo (JP); Nippon Polyurethane Industry Co, Ltd., Tokyo (JP)

( * ) Notice: Subject to any disclaimer, the term of this patent is extended or adjusted under 35 U.S.C. 154(b) by 0 days.

(21) Appl. No.: 09/976,011

(22) Filed: Oct. 15, 2001

(65) Prior Publication Data

US 2002/0101043 A1 Aug. 1, 2002

(30) Foreign Application Priority Data

Oct. 18, 2000 (JP) .................................... P2000-318166
Sep. 26, 2001 (JP) .................................... P2001-294178

(51) Int. Cl.$^7$ ............................................. C08G 18/79
(52) U.S. Cl. ........................... 528/60; 528/73; 215/233; 215/341; 215/352; 215/344; 215/DIG. 4; 220/378; 206/524.6
(58) Field of Search ................................ 215/233, 270, 215/341, 352, 344, DIG. 4; 220/378; 528/60, 73; 206/524.6

(56) References Cited

U.S. PATENT DOCUMENTS 3,799,380 A * 3/1974 Hashimoto et al.

OTHER PUBLICATIONS

M. Szycher; Polyurethanes; 1999; p. 4–33.*
M. Szycher; Polyuretanes; 1999; pp. 4–31 and 4–32.*
Patent Abstracts of Japan, 63008685 A, Jan. 14, 1988.
Patent Abstracts of Japan, 58067780 A, Apr. 22, 1983.
Patent Abstracts of Japan, 61009481 A, Jan. 17, 1986.
Patent Abstracts of Japan, 07188390 A, Jul. 25, 1995.
Patent Abstracts of Japan, 01226564 A, Sep. 11, 1989.
Patent Abstracts of Japan, 2000144100 A, May 26, 2000.

* cited by examiner

Primary Examiner—Rachel Gorr
(74) Attorney, Agent, or Firm—Sughrue Mion, PLLC

(57) ABSTRACT

A sealing gasket for closure, made of a polyurethane elastomer obtained by reacting the following (A) and (B):

(A) a polyisocyanate component having an isocyanate group content of 5 to 38% by weight and average 2 to 3 functional groups, obtained by modifying an aliphatic isocyanate and/or an alicyclic isocyanate, and (B) a polyol component having a hydroxyl value of 20 to 350 mgKOH/g and average 2 to 3 functional groups; and a process for producing a closure using such a sealing gasket.

The closure sealing gasket made of a polyurethane elastomer, obtained by the present invention, when used for a closure (e.g. a metal closure of food container), causes no yellowing by ultraviolet light, has a strength at least equal to those of sealing gaskets produced from an aromatic isocyanate.

16 Claims, No Drawings

SEALING GASKET FOR CLOSURE AND PROCESS FOR PRODUCTION OF CLOSURE USING THE SAME

BACKGROUND OF THE INVENTION

1. Field of the Invention

The present invention relates to a sealing gasket for closure, made of a polyurethane elastomer having a low hardness and causing no yellowing, as well as to a process for producing a closure using such a sealing gasket.

2. Related Prior Art

Many sealing gaskets for metal closure are made of a material using a polyvinyl chloride resin as a main component, for the good workability and moldability.

In these metal closure sealing gaskets, the polyvinyl chloride resin contains a plasticizer (typified by dioctyl phthalate) in a large amount and, therefore, there has been a problem that the plasticizer dissolves in the oil and fat, etc. with which the sealing gasket comes in contact. Against this dioctyl phthalate, there is a doubt that it may be an endocrine-disrupting substance. As a countermeasure therefor, a metal closure sealing gasket made of a polyvinyl chloride resin composition containing a derivative of an acyl oxycarboxylate as a plasticizer is described in, for example, JP-A-58-67780.

Also, in recent years, generation of dioxin in combustion of polyvinyl chloride resin for its disposal has become a social problem.

Meanwhile, molded polyurethane elastomers have excellent physical properties, for example, high tensile strength, fatigue resistance, good low-temperature flexibility, and abrasion resistance. Because of these properties, polyurethane elastomers are in use in production of rolls, packings, various machine parts, automobile parts, electronic apparatus parts, etc. Further, polyurethane elastomers are a high polymer material having very high biocompatibility to human body and, therefore, are also in use as a catheter, an artificial blood vessel, an artificial heart, an artificial kidney, etc.

As the process for producing a polyurethane resin, there is generally known, for example, a process of reacting a high-molecular polyhydroxyl compound, a low-molecular polyhydroxyl compound (a chain extender) and an organic polyisocyanate in the presence or absence of a catalyst.

This process is largely classified into two processes. One is a one-shot process of subjecting the above-three components to simultaneous reaction and casting; and the other is a prepolymer process of beforehand reacting a high-molecular polyhydroxyl compound and an organic polyisocyanate to form an isocyanate-terminated urethane prepolymer and then subjecting this prepolymer (as a main material) to a crosslinking reaction with a low-molecular polyhydroxyl compound.

As this prepolymer process for producing a polyurethane resin, there is disclosed, in, for example, JP-A-63-8685, a process which comprises reacting a polyester polyol with diphenylmethane diisocyanate to form an isocyanate-terminated urethane polymer and then subjecting this prepolymer (as a main material) to a heat treatment of 140° C. with a mixture (as a crosslinking agent) of 1,4-butanediol and trimethylolpropane to obtain a polyurethane elastomer having a hardness (JIS A) of 78 to 80. The polyurethane elastomer obtained by this process has excellent mechanical strengths and is well balanced as a cleaning part for electronic photocopier, in particular.

As the technique of using a polyurethane resin as a sealing gasket for a closure of a container (e.g. a pail or an open drum), there is, for example, a technique described in JP-A-61-9481. In this technique, a first solution containing a urethane prepolymer as a main component and a second solution containing a polyol as a main component are mixed to obtain a mixture having a controlled viscosity of 200 to 20,000 mPa·s at 0 to 60° C.

In the above technique disclosed in JP-A-61-9481, as the polyisocyanate compound used for obtaining the urethane prepolymer, there are mentioned tolylene diisocyanate, diphenylmethane diisocyanate, etc. In the Examples of the literature, there is used an isocyanate-terminated prepolymer obtained by reacting tolylene diisocyanate and a bifunctional polypropylene glycol.

Polyurethane elastomers using such an aromatic isocyanate have a long history. In the casting by the prepolymer process, a short-chain glycol such as 1,4-butanediol, trimethylolpropane or the like is used as a curing agent for diphenylmethane diisocyanate-based urethane prepolymer, and an amine compound typified by CUAMINE or MOCA is used as a curing agent for tolylene diisocyanate-based urethane prepolymer. A polyurethane elastomer produced by curing with MOCA has a long history, but MOCA is feared for its possible carcinogenicity.

Polyurethane elastomers using an aromatic isocyanate have excellent mechanical strengths. However, when they are produced so as to have a low hardness, specifically a JIS A hardness of 75 or less, they are extremely inferior in mechanical properties and have had a problem particularly in tensile strength. Further, since aromatic polyisocyanates cause yellowing with the lapse of time, it was impossible to produce a molded polyurethane elastomer causing no yellowing, using an aromatic isocyanate.

Furthermore, when a polyurethane elastomer is used in hygienic storage of food, the aromatic isocyanate used as a component of the polyurethane elastomer is hydrolyzed to become an amine compound. For example, 4,4'-diphenylmethane diisocyanate, when hydrolyzed, becomes 4,4'-diaminodiphenylmethane. This compound is ordinarily called DAM and has a very high carcinogenicity. Therefore, it is not preferred to use an aromatic amine or a compound which may become an amine terminal when hydrolyzed, for production of a polyurethane elastomer used in hygienic storage of food.

OBJECTS AND SUMMARY OF THE INVENTION

The present invention aims at providing a sealing gasket for closure (e.g. metal closure of food container), made of a polyurethane elastomer of low hardness and no yellowing and usable even in hygienic storage of food; and a process for producing a closure using such a sealing gasket.

As a result of a study, the present inventors found out that the above aims can be achieved by forming a polyurethane elastomer of low hardness and no yellowing using a non-aromatic polyisocyanate component and a particular polyol component. The present invention has been completed based on the above finding.

The present invention lies in the following (1) to (3).

(1) A sealing gasket for closure, made of a polyurethane elastomer obtained by reacting the following (A) and (B):

(A) a polyisocyanate component having an isocyanate group content of 5 to 38% by weight and average 2 to 3 functional groups, obtained by modifying an aliphatic isocyanate and/or an alicyclic isocyanate, and (B) a polyol component having a hydroxyl value of 20 to 350 mgKOH/g and average 2 to 3 functional groups.

(2) A process for producing a closure, which comprises reacting the following (A) and (B) at the inner side of a closure to synthesize a polyurethane elastomer in such a state that the polyurethane elastomer is integrated with the closure:

(A) a polyisocyanate component having an isocyanate group content of 5 to 38% by weight and average 2 to 3 functional groups, obtained by modifying an aliphatic isocyanate and/or an alicyclic isocyanate, and (B) a polyol component having a hydroxyl value of 20 to 350 mgKOH/g and average 2 to 3 functional groups.

(3) A process for producing a closure, which comprises lining the inner side of a closure with the following (A) and (B) and then reacting the (A) and the (B) at 150 to 240° C. for 20 to 200 seconds to synthesize a polyurethane elastomer in such a state that the polyurethane elastomer is integrated with the closure:

(A) a polyisocyanate component having an isocyanate group content of 5 to 38% by weight and average 2 to 3 functional groups, obtained by modifying an aliphatic isocyanate and/or an alicyclic isocyanate, and (B) a polyol component having a hydroxyl value of 20 to 350 mgKOH/g and average 2 to 3 functional groups.

DETAILED DESCRIPTION OF THE INVENTION

The present invention is described in detail below.

As the aliphatic isocyanate and alicyclic isocyanate used in the present invention, there can be mentioned hydrogenated aromatic isocyanates, hexamethylene diisocyanate (HDI), isophorone diisocyanate (IPDI), lysine diisocyanate, etc. Of these, HDI and/or IPDI is preferred.

Polyurethane resins obtained from aromatic polyisocyanates such as tolylene diisocyanate, diphenylmethane diisocyanate and the like are known to cause yellowing and are not ordinarily preferred in applications which come in sight of general consumers. Meanwhile, polyurethane resins obtained from aliphatic isocyanates or alicyclic isocyanates are known not to cause yellowing and are in use in a large amount as an isocyanate source for coating resin. These non-aromatic isocyanates, however, have problems; for example, they have low reactivity and polyurethane elastomers produced therefrom have low tensile strengths. Therefore, the use of the non-aromatic isocyanates has been limited. In the present invention, the above problems have been alleviated by modification of aliphatic isocyanate and/or alicyclic isocyanate.

As the method for modification of aliphatic isocyanate and/or alicyclic isocyanate for production of the polyisocyanate component (A) of the present invention, there can be mentioned, for example, a dimerization reaction (formation of uretdione bond or subsequent formation of carbodiimide bond), a trimerization reaction (formation of isocyanurate bond) or a higher polymerization reaction (formation of uretonimine bond), each of an aliphatic isocyanate and/or an alicyclic isocyanate; a urea-forming reaction, a urethanization reaction or an amidation reaction, each between the above isocyanate and a polyfunctional active hydrogen group-containing compound (e.g. water, polycarboxylic acid, polyol or polyamine); an allophanate-forming reaction or a biuret-forming reaction, each between one of the above reaction products and the above isocyanate; a blocking reaction (masking) between the above isocyanate and a monofunctional active hydrogen group-containing compound (e.g. phenol or monool); and a high polymer-forming reaction or a modification reaction, each between the above isocyanate and a high-molecular polyol having a bond or a substituent (e.g. polyester polyol, polyether polyol or graft polyol). Of these modification methods, preferred are a dimerization reaction, a trimerization reaction, a higher polymerization reaction, a urethanization reaction, a urea-forming reaction, an amidation reaction, an allophanate-forming reaction and a biuret-forming reaction, all using the above isocyanate. Particularly preferred are a dimerization reaction, a trimerization and a urethanization reaction, all using the above isocyanate.

As a specific example of the polyisocyanate component (A), there is preferred a polyisocyanate obtained, as described in JP-B-63-35655, by reacting HDI with a polyol having a number-average molecular weight of 3,000 or less and average 2 to 3 functional groups, to urethanize 15% by weight or less of the total isocyanate groups of HDI to synthesize an HDI-polyol adduct, and then adding, to the HDI-polyol adduct, 0.001 to 0.25% by weight of an isocyanurate-forming catalyst and 0.5% by weight of a co-catalyst to subject 60% by weight or less of the total isocyanate groups to an isocyanurate-forming reaction at 100° C. or less.

Also preferred is, for example, an isocyanate-terminated prepolymer obtained from HDI or IPDI and a low-molecular polyol and/or a high-molecular polyol.

As the low-molecular polyol, there can be mentioned, for example, ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, cyclohexane-1,4-diol, cyclohexane-1,4-dimethanol, dimethylolheptane, dimer acid diol, trimethylolpropane, glycerine, hexanetriol, quadrol, bisphenol A, hydrogenated bisphenol A, compounds having a number-average molecular weight of less than 500, obtained by adding, to one of the above alcohols, ethylene oxide or propylene oxide, and N,N,N',N'-tetrakis(2-hydoxypropyl)-ethylenediamine.

The high-molecular polyol is a polyol having a number-average molecular weight of 500 or more, preferably 500 to 10,000. As specific examples of the high-molecular polyol, there can be mentioned polypropylene glycol type polyether polyols (PPGs), polytetramethylene ether glycols (PTMGs), adipate type polyester polyols, polycaprolactone type polyester polyols and polycarbonate type polyols, typified by commercial products such as Preminol and Excenol of Asahi Glass Co., Ltd. and ACLAIM of LION DELL.

In the present invention, when the polyisocyanate component (A) is produced from HDI, the amount of free HDI in the polyisocyanate component (A) is preferably 1% by weight or less because HDI has a low boiling point, a high vapor pressure and an offensive odor. The polyisocyanate component (A) is preferably a liquid at ordinary temperature for easy handling.

In the present invention, the polyisocyanate component (A) can be used singly or in admixture of two or more kinds.

The isocyanate group content in the polyisocyanate component (A) is 5 to 38% by weight, preferably 8 to 25% by weight. When the isocyanate group content is less than 5% by weight, the polyisocyanate has too high a viscosity and is difficult to handle. When the isocyanate group content is more than 38% by weight, it is substantially difficult to control the concentration of free raw material isocyanate at 1% by weight or less. The "isocyanate group content" referred to herein is the content of isocyanate groups reactive with the polyol component (B), and includes even those isocyanate groups which show no activity of isocyanate group at ordinary temperature but generate isocyanate group at high temperatures, such as hydroxyl-blocked isocyanate group, uretdione group formed by cyclic polymerization of two isocyanate groups, and uretonimine bond formed by addition of one isocyanate group to carbodiimide group. However, the hydroxyl-blocked isocyanate group is not preferred in the present invention because the blocking agent used vaporizes and causes a problem.

The average number of functional groups in the polyisocyanate component (A) is 2 to 3 in view of the compression set and the amount of dissolution of the polyurethane elastomer obtained.

In the present invention, the polyol component (B) is specifically a high-molecular polyol, a low-molecular polyol or a mixture thereof. A high-molecular polyol or a mixture of a high-molecular polyol and a low-molecular polyol is preferred because it enables easy achievement of required properties.

In the present invention, each of the high-molecular polyol and the low-molecular polyol can be used singly or in admixture of two or more kinds.

As the high-molecular polyol, there can be mentioned the previously-mentioned polyols having a number-average molecular weight of 500 or more. Of these high-molecular polyols, preferred are PTMGs and adipate type polyester polyols for the low dissolution of the polyurethane elastomer formed therewith. PTMGs and PPGs are more preferred for the hydrolysis resistance. PTMGs preferably have a number-average molecular weight of 500 to 2,000. When the number-average molecular weight is more than 2,000, the PTMG has high crystallinity and is difficult to handle.

As the low-molecular polyol, there can be mentioned the previously-mentioned polyols having a number-average molecular weight of less than 500.

There is no particular restriction as to the amount of the low-molecular weight polyol used. The amount is appropriately determined depending upon, for example, the hardness to be possessed by the intended polyurethane elastomer; however, the amount is preferably 5 moles or less, particularly preferably 0.1 to 3 moles per mole of the high-molecular polyol.

The polyol component (B) has a hydroxyl value of 20 to 350 mgKOH/g, preferably 100 to 350 mgKOH/g. When the hydroxyl value is less than 20 mgKOH/g, the polyurethane elastomer obtained is too soft and has too large a compression set. When the hydroxyl vale is more than 350 mgKOH/g, the polyurethane elastomer obtained is too hard and is unsuitable for use as a sealing gasket. The average number of functional groups of the polyol component (B) is 2 to 3 correspondingly to the average number of functional groups of the polyisocyanate component (A), because the polyurethane elastomer is preferably crosslinked to an appropriate extent.

In the closure sealing gasket of the present invention, it is possible to use as necessary additives ordinarily used in polyurethane resins, such as catalyst, filler, coloring agent, antioxidant, lubricant, flame retardant, ultraviolet absorber, light stabilizer, electrical insulation improver, fungicide, silicone type surfactant, metal salt of organic acid, wax derived from organic acid, metal oxide, metal hydroxide, internal releasing agent, reinforcing agent, foaming agent and the like.

As the catalyst, there can be mentioned, for example, dibutyltin dilaurate, dioctyltin dilaurate (DOTDL), triethylamine, bismuth 2-ethylhexanoate, diazabicycloundecene, dimethyltin bis(iso-octylglycolate), monomethyltin tris(iso-octylglycolate), di(n-octyl)tin S,S'-bis(iso-octylmercaptoacetate) and di(n-octyl)tin maleate polymer.

The filler is used in order for the molded article obtained to have improved shape retainability, and there can be mentioned a glass fiber, talc, alcium carbonate, calcium oxide, powdery silica, etc.

As the coloring agent, pigments (e.g. titanium oxide) and dyes can be mentioned.

The antioxidant is preferably a hindered phenol type antioxidant. As specific examples, there can be mentioned 3-methyl-2,6-tert-butyl-phenol, tetrakis[methylene-3(3',5'-di-tert-butyl-4'-hydroxyphenyl)propionate](Irganox 1010 produced by Ciba-Geigy Japan Limited), etc. Irganox 1010 is preferred viewed from the dissolution.

The additives can be added to the polyisocyanate component (A) or to the polyol component (B). However, since some additives react with isocyanate group, addition to the polyol component (B) is preferred.

In the present invention, when the polyisocyanate component (A) is reacted with the polyol component (B) to synthesize a polyurethane elastomer, the polyisocyanate component (A) is used in such a proportion that the isocyanate group become preferably 0.9 to 1.5 moles, more preferably about 1.00 to 1.10 moles per mole of the total active hydrogen atoms possessed by the polyol component (B) and other components.

In synthesizing the polyurethane elastomer of the present invention, a known urethanization technique can be used. It may be any of a prepolymer process and a one-shot process.

The polyurethane elastomer used in the present invention preferably has a JIS A hardness of 10 to 70, a tensile strength of 1 to 40 MPa and a compression set of 0.1 to 60%. It is an elastomer of low hardness and no yellowing.

When the JIS A hardness of the polyurethane elastomer is less than 10 and when such a polyurethane elastomer is used as a sealing gasket for a closure for container and the closure is applied to a container, the sealing gasket is contacted with the mouth portion of the container too strongly, often making difficult the removal of the closure. When the JIS A hardness of the polyurethane elastomer is larger than 70, the sealing gasket is contacted with the container mouth portion insufficiently (the sealing area is small), often making insufficient the sealing of the container.

When the polyurethane elastomer has a tensile strength of less than 1 MPa, the sealing gasket has an insufficient dynamic strength and is cut off when the closure fitted with the sealing gasket is opened or closed or when the container sealed with the closure is piled up, resulting in impaired sealability. When the polyurethane elastomer has a tensile strength of more than 40 MPa, the contact of the sealing gasket with the container mouth portion is insufficient, resulting in a small sealing area and insufficient sealability.

When the polyurethane elastomer has a compression set of less than 0.1%, the contact of the sealing gasket with the container mouth portion is insufficient, resulting in a small sealing area and insufficient sealability. When the polyurethane elastomer has a compression set of more than 60%, the sealing gasket causes creep owing to the vacuum of the container inside or the pressure applied when the container sealed with the closure is piled up, finally resulting in cutting-off of the sealing gasket along the container mouth.

The polyurethane elastomer used in the closure sealing gasket of the present invention, when subjected to a retort treatment of 120° C.×30 minutes using 10 ml, per g of the polyurethane elastomer, of water, gives an extract showing a potassium permanganate consumption of preferably 30 ppm or less.

In producing a closure (e.g. a metal closure for food container) according to the present invention, the inner side of the groove of a closure is lined with a mixture of the polyisocyanate component (A) and the polyol (B); a reaction is allowed to take place between the component (A) and the component (B) at 150 to 240° C. for 20 to 200 seconds; thereby, a polyurethane elastomer (a sealing gasket) is formed integrally with the closure. When the heating temperature is lower than 150° C., the formation of the polyurethane elastomer is insufficient. When the temperature is higher than 240° C., decomposition of urethane bond may occur. When the heating time is shorter than 20 seconds, the formation of the polyurethane elastomer is insufficient. When the time is longer than 200 seconds, polyurethane elastomer productivity is low and the conventional production line for polyvinyl chloride plastisol is unusable.

In producing a closure (e.g. a metal closure for food container) using a polyurethane elastomer synthesized beforehand, the polyurethane elastomer is melted and extruded into a closure made of a metal, a plastic or the like, or is injected thereinto, to make the polyurethane elastomer integral with the closure. Alternatively, a polyurethane elastomer powder may be placed in a closure and melted to make the polyurethane elastomer integral with the closure. The melting temperature is preferably 150 to 240° C.

As described above, the sealing gasket made of a polyurethane elastomer, obtained in the present invention, when used for a closure (e.g. a metal closure of food container), causes no yellowing by ultraviolet light, has a strength at least equal to those of sealing gaskets produced from an aromatic isocyanate and, moreover, excellent rubber properties, is low in dissolution in liquid foods contained in the food container, and promises sufficient sealability.

The process for producing a closure according to the present invention is high in productivity and can use the production facilities for other materials such as polyvinyl chloride resin and the like.

DESCRIPTION OF THE PREFERRED EMBODIMENTS

The present invention is described in more detail below by way of Examples. However, the present invention should not be construed to be restricted by the Examples.

In the following Synthesis Examples, etc., % refers to % by weight in all cases.

Isocyanate group content was measured by JIS K 7301, and hydroxyl value was measured according to a method specified by JIS K 1601.

The raw materials used in Synthesis examples, etc. are as follows.

HDI: hexamethylene diisocyanate

IPDI: isophorone diisocyanate

Polyisocyanate X: a modified polyisocyanate obtained by subjecting hexamethylene diisocyanate (HDI) to a urethanization reaction and an isocyanurate-forming reaction; urethanization=2%; isocyanate group content= 21.3%; average functional groups=3.4; free HDI=1% or less MDI: 4,4'-diphenylmethane diisocyanate produced by Nippon Polyurethane Industry Co., Ltd.

TDI: tolylene diisocyanate produced by Nippon Polyurethane Industry Co., Ltd.

N-4012: adipate type polyester glycol produced by Nippon Polyurethane Industry Co., Ltd.; hydroxyl value= 56; average functional groups=2

P-1010: adipate type polyester glycol produced by KURARAY Co., LTD.; hydroxyl value=112; average functional groups=2

F-510: adipate type polyestertriol produced by KURARAY Co., LTD.; hydroxyl value=336; average functional groups=3

PTG-1000SN: polytetramethylene ether glycol produced by Hodogaya Chemical Co., Ltd.; hydroxyl value=112; average functional groups=2

TMP: trimethylolpropane 1,3-BG: 1,3-butanediol 1,4-BG: 1,4-butanediol

EDP-300: N,N,N',N'-tetrakis(2-hydroxypropyl) ethylenediamine produced by ASAHI DENKA KOGYO K. K.

DOTDL: dioctyltin dilaurate

KS-1010A-1: di(n-octyl)tin maleate polymer produced by KYODO CHEMICAL Co., LTD.

SYNTHESIS EXAMPLE 1

Into a reactor were fed 70.7 g of HDI, 7.6 g of 1,3-BG, 6.6 g of neopentyl glycol and 15.2 g of hydrogenated bisphenol A. They were allowed to give rise to a reaction at 70° C. for 5 hours to obtain a viscous liquid having average 2 functional groups and an isocyanate group content of 17.6%. This liquid is named as polyisocyanate A.

SYNTHESIS EXAMPLE 2

78.9 g of HDI and 21.1 g of 1,3-BG were fed into a reactor and allowed to give rise to a reaction at 70° C. for 5 hours to obtain a viscous liquid having average 2 functional groups and an isocyanate group content of 19.7%. This liquid is named as polyisocyanate B.

SYNTHESIS EXAMPLE 3

83 g of IPDI and 17 g of 1,3-BG were fed into a reactor and allowed to give rise to a reaction at 70° C. for 5 hours to obtain a viscous liquid having average 2 functional groups and an isocyanate group content of 15.7%. This liquid is named as polyisocyanate C.

SYNTHESIS EXAMPLE 4

60 g of HDI, 20 g of PTG-1000SN and 20 g of 1,3-BG were fed into a reactor and allowed to give rise to a reaction at 70° C. for 5 hours to obtain a viscous liquid having average 2 functional groups and an isocyanate group content of 9.6%. This liquid is named as polyisocyanate D.

EXAMPLES 1 to 9 AND COMPARATIVE EXAMPLES 1 TO 2

[Production of Polyurethane Elastomer Sheets]

Individual raw materials beforehand subjected to vacuum degassing were fed into respective filling tanks in an amount ratio shown in Table 1. The raw materials in the tanks were mixed using a metering, discharging and compounding machine (a metering pump was present between each filling tank and the compounding machine) so as to avoid air trapping, whereby a reaction was allowed to take place between the polyisocyanate component and the polyol component at 100° C. for 1 hour to obtain various polyurethane elastomer sheets of 2 mm in thickness, 200 mm in width and 150 mm in length.

Each polyurethane sheet was measured for physical properties. The results are shown in Table 1.

The physical properties were measured according to JIS K 7312. The weather resistance was measured using a sunshine weatherometer and rated by visually examining the appearance after 600 hours.

[Measurement of Potassium Permanganate Consumption]

15 g of each polyurethane sheet obtained above was immersed in 150 ml of distilled water. They were subjected to a retort treatment at 120° C. for 30 minutes. The aqueous solution (extract) after retort treatment was measured for potassium permanganate consumption (ppm) according to Notification No. 20 of the Welfare Ministry. The results are shown in Table 1.

mouthed bottle for food, in a thickness of 1 mm, using a mixing and discharging machine. The resulting closure was immediately placed in an oven of 200° C. for 60 seconds to give rise to a reaction, whereby was obtained a sealing gasket-integrated metal closure for wide-mouthed bottle.

[Evaluation of Sealing Gasket]

Hot water of 90° C. was filled in a wide-mouthed bottle by 80% of the internal volume. The bottle was sealed with the above-obtained metal closure and then subjected to a retort treatment at 120° C. for 30 minutes. Thereafter, the bottle was subjected to a stability test of one month at 37° C. The sealability of the bottle was evaluated by the vacuum and vacuum change of the bottle obtained by measuring the internal pressure of the bottle using a vacuum gauge. The

TABLE 1

| | Examples | | | | | | | | | Comparative Examples | |
|---|---|---|---|---|---|---|---|---|---|---|---|
| | 1 | 2 | 3 | 4 | 5 | 6 | 7 | 8 | 9 | 1 | 2 |
| Polyisocyanate component composition (g) | | | | | | | | | | | |
| Polyisocyanate A | 96 | | | | | | 96 | 85 | | | |
| Polyisocyanate B | | 83 | 86 | | | | | | 32 | 33 | |
| Polyisocyanate C | | | | 108 | | | | | | | |
| Polyisocyanate D | | | | | 175 | | | | | | |
| Polyisocyanate X | | 2 | | | | | | 2 | | | |
| MDI | | | | | | | | | | 50 | |
| TDI | | | | | | | | | | | 35 |
| Polyisocyanate component properties | | | | | | | | | | | |
| Isocyanate group content (%) | 17.6 | 19.7 | 19.7 | 15.7 | 9.6 | 17.6 | 17.7 | 19.7 | 19.7 | 33.6 | 48.3 |
| Average functional groups | 2 | 2.02 | 2 | 2 | 2 | 2 | 2.02 | 2 | 2 | 2 | 2 |
| Polyol component composition (g) | | | | | | | | | | | |
| N-4012 | 160 | 160 | | | | | | | | | |
| PTG-1000SN | | | 80 | 80 | 80 | 80 | 160 | 30 | 63 | 80 | 80 |
| P-1010 | | | | | | | | 30 | | 6 | 6 |
| F-510 | | | | | | | | 4 | | 4 | 4 |
| TMP | 6 | 6 | 6 | 6 | 6 | 1 | | | | | |
| 1,4-BG | 4 | 4 | 4 | 4 | 4 | 9 | 2 | | | | |
| EDP-300 | | | | | | | | | 1.5 | | |
| Polyol component properties | | | | | | | | | | | |
| Hydroxyl value (mg KOH/g) | 126 | 126 | 238 | 238 | 238 | 238 | 126 | 128 | 127 | 238 | 238 |
| Average functional groups | 2.26 | 2.26 | 2.26 | 2.26 | 2.26 | 2.04 | 2 | 2.12 | 2.11 | 2.26 | 2.26 |
| Catalyst (ppm) | | | | | | | | | | | |
| DOTDL | 50 | 50 | 50 | 50 | 50 | 50 | 50 | | | 50 | 50 |
| KS-1010A-1 | | | | | | | | 300 | 300 | | |
| Polyurethane elastomer properties | | | | | | | | | | | |
| Hardness (JIS A) | 70 | 69 | 68 | 60 | 60 | 60 | 55 | 60 | 64 | 76 | 72 |
| 100% modulus (MPa) | 3.0 | 5.2 | 3.0 | 1.4 | 1.3 | 1.4 | 0.9 | 2.8 | 2.2 | 6.1 | 4.0 |
| 300% modulus (MPa) | 9.5 | 15 | 14.3 | 3.5 | 3.2 | 2.8 | 1.8 | 4.8 | 3.8 | 18 | 16 |
| TB (MPa) | 32 | 35 | 25 | 20 | 21 | 25 | 22 | 15 | 13 | 38 | 35 |
| EB (%) | 520 | 350 | 300 | 500 | 520 | 560 | 590 | 550 | 450 | 380 | 420 |
| CS (%): 70° C. × 22 hours | 1.1 | 0.5 | 1.3 | 1.4 | 1.3 | 7.0 | 18.0 | 1.7 | 1.8 | 1.2 | 1.0 |
| Weather resistance (after 600 hours) | * | * | * | * | * | * | * | * | * | ** | ** |
| Potassium permanganate consumption (ppm) | 8 | 8 | 6 | 5 | 5 | 6 | 9 | 0.6 | 1.1 | | |

*: No change
**: Yellowing

EXAMPLE 10

[Production of Closure]

There were premixed 40 g of PTG-1000SN, 3 g of TMP, 2 g of 1,4-BG, 50 ppm of DOTDL, 40 g of calcium oxide, 2 g of titanium oxide, 0.4 g of a lubricant and 0.4 g of an antioxidant to prepare a polyol composition. 49 g of polyisocyanate A controlled to 40±2° C. and 87 g of the polyol composition controlled to 40±2° C. were mixed and discharged onto the groove formed at the inner side circumference of a coated metal closure (a white cap) of a widevacuum after the stability test was 30 cmHg and was the same as that before the test. The cap was removed after the stability test of one month at 37° C. and the condition of the sealing gasket after the test was examined visually. As a result, there was no abnormality in the condition of the sealing gasket. In an unsuitable sealing gasket, there arises a cut-through phenomenon; that is, cutting-off of sealing gasket takes place along the bottle mouth and the inner surface of the metal closure is exposed.

A polyurethane elastomer sheet was produced in the same manner as in Example 1 and used for measurement of sealing gasket physical properties. The reaction conditions in sheet production were 200° C. and 60 seconds. The sheet showed a tensile strength of 15 MPa, a hardness of 68, an elongation of 310%, a compression set of 8% and a potassium permanganate consumption of 6 ppm. The elastomer showed no discoloration even after 2-month storage.

EXAMPLE 11

[Production of Closure]

There were premixed 30 g of PTG-1000SN, 30 g of P-1010, 4 g of F-510, 300 ppm of KS-1010A-1, 40 g of talc, 2 g of titanium oxide, 0.4 g of a lubricant and 0.4 g of an antioxidant to prepare a polyol composition. 32 g of polyisocyanate B controlled to 40±2° C. and 87 g of the polyol composition controlled to 40±2° C. were mixed and discharged onto the groove formed at the inner side circumference of a coated metal closure (a white cap) of a wide-mouthed bottle for food, in a thickness of 1 mm, using a mixing and discharging machine. The resulting closure was immediately placed in an oven of 200° C. for 60 seconds to give rise to a reaction, whereby was obtained a sealing gasket-integrated metal closure for wide-mouthed bottle.

[Evaluation of Sealing Gasket]

Hot water of 90° C. was filled in a wide-mouthed bottle by 80% of the internal volume. The bottle was sealed with the above-obtained metal closure and then subjected to a retort treatment at 120° C. for 30 minutes. Thereafter, the bottle was subjected to a stability test of one month at 37° C. The sealability of the bottle was evaluated by the vacuum and vacuum change of the bottle obtained by measuring the internal pressure of the bottle using a vacuum gauge. The vacuum after the stability test was 30 cmHg and was the same as that before the test. The cap was removed after the stability test of one month at 37° C. and the condition of the sealing gasket after the test was examined visually. As a result, there was no abnormality in the condition of the sealing gasket. In an unsuitable sealing gasket, there arises a cut-through phenomenon; that is, cutting-off of sealing gasket takes place along the bottle mouth and the inner surface of the metal closure is exposed.

A polyurethane elastomer sheet was produced in the same manner as in Example 1 and used for measurement of sealing gasket physical properties. The reaction conditions in sheet production were 200° C. and 60 seconds. The sheet showed a tensile strength of 10 MPa, a hardness of 60, an elongation of 400%, a compression set of 2% and a potassium permanganate consumption of 1 ppm. The elastomer showed no discoloration even after 2-month storage.

COMPARATIVE EXAMPLE 3

85 g of a polypropylene glycol having an average molecular weight of 2,000 was reacted with 15 g of TDI to obtain 100 g of a solution A composed of a prepolymer having an isocyanate group content of 3.7%. Separately, 42.9 g of PML-3003, 4.8 g of methylene-bis(orthochloroaniline) (MOCA), 2.4 g of lead octylate (20%) and 49.9 g of calcium carbonate were premixed to obtain a solution B. The solution A and the solution B were mixed. The inner side of a closure was lined with the mixture in the same manner as in Example 10, followed by heating at 100° C. for 5 minutes to give rise to a reaction, whereby was obtained a sealing gasket-integrated metal closure for wide-mouthed bottle.

[Evaluation of Sealing Gasket]

Hot water of 90° C. was filled in a wide-mouthed bottle by 80% of the internal volume. The bottle was sealed with the above-obtained metal closure and then subjected to a retort treatment at 120° C. for 30 minutes. Thereafter, the bottle was subjected to a stability test of one month at 37° C. The sealability of the bottle was evaluated by the vacuum and vacuum change of the bottle obtained by measuring the internal pressure of the bottle using a vacuum gauge. The initial vacuum was 25 cmHg but the vacuum after the stability test was about 0 cmHg; thus, the sealability of the bottle was inferior. The cap was removed after the stability test of one month at 37° C. and the condition of the sealing gasket after the test was examined visually. As a result, there was a cut-through phenomenon; that is, cutting-off of sealing gasket took place along the bottle mouth and the inner surface of the metal closure was exposed.

A polyurethane elastomer sheet was produced in the same manner as in Example 1 and used for measurement of sealing gasket physical properties. The reaction conditions in sheet production were 200° C. and 60 seconds. The sheet showed a tensile strength of 15 MPa, a hardness of 80, an elongation of 300%, a compression set of 61% and a potassium permanganate consumption of 33 ppm. The elastomer showed yellowing after 2-month storage.

What is claimed is:

1. A sealing gasket for closure comprising a polyurethane elastomer obtained by reacting the following (A) and (B):
   (A) a polyisocyanate component having an isocyanate group content of 5 to 38% by weight and average 2 to 3 functional groups, obtained by modifying an aliphatic isocyanate and/or an alicyclic isocyanate, and
   (B) a polyol component having a hydroxyl value of 20 to 350 mgKOH/g and average 2 to 3 functional groups, consisting of one or more high-molecular polyol(s), wherein the one or more high-molecular polyol(s) is at least one member selected from polytetramethylene ether glycols and adipate polyester polyols.

2. A sealing gasket for closure comprising a polyurethane elastomer obtained by reacting the following (A) and (B):
   (A) a polyisocyanate component having an isocyanate group content of 5 to 38% by weight and average 2 to 3 functional groups, obtained by modifying an aliphatic isocyanate and/or an alicyclic isocyanate, and
   (B) a polyol component having a hdyroxyl value of 20 to 350 mgKOH/g and average 2 to 3 functional groups, consisting of a mixture of a high-molecular polyol and a low-molecular polyol, wherein the high-molecular polyol is at least one member selected from polytetramethylene ether glycols and adipate polyester polyols.

3. A process for producing a closure, which comprises reacting the following (A) and (B) at the inner side of a closure to synthesize a polyurethane elastomer in such a state that the polyurethane elastomer is integrated with the closure:
   (A) a polyisocyanate component having an isocyanate group content of 5 to 38% by weight and average 2 to 3 functional groups, obtained by modifying an aliphatic isocyanate and/or an alicyclic isocyanate, and
   (B) a polyol component having a hydroxyl value of 20 to 350 mgKQH/g and average 2 to 3 functional groups, consisting of one or more high-molecular polyol(s) wherein the one or more high-molecular polyol(s) is at least one member selected from polytetramethylene ether glycols and adipate polyester polyols.

4. A process for producing a closure, which comprises reacting the following (A) and (B) at the inner side of a closure to synthesize a polyurethane elastomer in such a state that the polyurethane elastomer is integrated with the closure:

(A) a polyisocyanate component having an isocyanate group content of 5 to 38% by weight and average 2 to 3 functional groups, obtained by modifying an aliphatic isocyanate and/or an alicyclic isocyanate, and (B) a polyol component having a hydroxyl value of 20 to 350 mgKOH/g and average 2 to 3 functional groups, consisting of a mixture of a high-molecular polyol and a low-molecular polyol, wherein the high-molecular polyol is at least one member selected from polytetramethylene ether glycols and adipate polyester polyols.

5. A process for producing a closure according to claim 3, wherein the inner side of the closure is lined with (A) and (B) and then (A) and (B) are reacted at 150 to 240° C. for 20 to 200 seconds to synthesize a polyurethane elastomer in such a state that the polyurethane elastomer is integrated with the closure.

6. A process for producing a closure according to claim 4, wherein the inner side of the closure is lined with (A) and (B) and then (A) and (B) are reacted at 150 to 240° C. for 20 to 200 seconds to synthesize a polyurethane elastomer in such a state that the polyurethane elastomer is integrated with the closure.

7. A sealing gasket for closure according to claim 1, wherein the polyurethane elastomer is obtained by reacting (A) and (B) at 150 to 240° C. for 20 to 200 seconds.

8. A sealing gasket for closure according to claim 2, wherein the polyurethane elastomer is obtained by reacting (A) and (B) at 150 to 240° C. for 20 to 200 seconds.

9. A sealing gasket for closure according to claim 1, wherein the (A) is obtained by modifying hexamethylene diisocyanate and/or isophorone diisocyanate according to an isocyanurate-forming reaction and/or a urethanization reaction.

10. A sealing gasket for closure according to claim 2, wherein the (A) polyisocyanate component is obtained by modifying hexamethylene diisocyanate and/or isophorone diisocyanate according to an isocyanurate-forming reaction and/or a urethanization reaction.

11. A process for producing a closure according to claim 3, wherein the (A) polyisocyanate component is obtained by modifying hexamethylene diisocyanate and/or isophorone diisocyanate according to an isocyanurate-forming reaction and/or a urethanization reaction.

12. A process for producing a closure according to claim 4, wherein the (A) polyisocyanate component is obtained by modifying hexamethylene diisocyanate and/or isophorone diisocyanate according to an isocyanurate-forming reaction and/or a urethanization reaction.

13. A process for producing a closure according to claim 5, wherein the (A) polyisocyanate component is obtained by modifying hexamethylene diisocyanate and/or isophorone diisocyanate according to an isocyanurate-forming reaction and/or a urethanization reaction.

14. A process for producing a closure according to claim 6, wherein the (A) polyisocyanate component is obtained by modifying hexamethylene diisocyanate and/or isophorone diisocyanate according to an isocyanurate-forming reaction and/or a urethanization reaction.

15. A sealing gasket for closure according to claim 7, wherein the (A) polyisocyanate component is obtained by modifying hexamethylene diisocyanate and/or isophorone diisocyanate according to an isocyanurate-forming reaction and/or a urethanization reaction.

16. A sealing gasket for closure according to claim 8, wherein the (A) polyisocyanate component is obtained by modifying hexamethylene diisocyanate and/or isophorone diisocyanate according to an isocyanurate-forming reaction and/or a urethanization reaction.

\* \* \* \* \*